United States Patent
Zhao

(10) Patent No.: US 12,543,187 B2
(45) Date of Patent: Feb. 3, 2026

(54) COMMUNICATION METHOD, ELECTRONIC DEVICE AND STORAGE MEDIUM

(71) Applicant: BEIJING XIAOMI MOBILE SOFTWARE CO., LTD., Beijing (CN)

(72) Inventor: Qun Zhao, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 391 days.

(21) Appl. No.: 18/035,477

(22) PCT Filed: Nov. 6, 2020

(86) PCT No.: PCT/CN2020/127113
§ 371 (c)(1),
(2) Date: May 4, 2023

(87) PCT Pub. No.: WO2022/094927
PCT Pub. Date: May 12, 2022

(65) Prior Publication Data
US 2023/0337245 A1    Oct. 19, 2023

(51) Int. Cl.
*H04W 72/23* (2023.01)
*H04W 72/1273* (2023.01)

(52) U.S. Cl.
CPC ....... *H04W 72/23* (2023.01); *H04W 72/1273* (2013.01)

(58) Field of Classification Search
CPC ... H04L 5/0094; H04L 5/0053; H04L 5/0064; H04L 5/0007; H04W 72/23; H04W 72/1273
See application file for complete search history.

(56) References Cited

U.S. PATENT DOCUMENTS

| | | |
|---|---|---|
| 2019/0260524 A1 | 8/2019 | Nam et al. |
| 2019/0281587 A1 | 9/2019 | Zhang et al. |
| 2020/0107305 A1* | 4/2020 | Chou ............. H04W 72/23 |
| 2020/0107345 A1* | 4/2020 | Ang ............... H04W 72/23 |
| 2020/0351926 A1 | 11/2020 | Bagheri et al. |
| 2021/0336724 A1* | 10/2021 | Song .............. H04L 5/0053 |

(Continued)

FOREIGN PATENT DOCUMENTS

| | | |
|---|---|---|
| CN | 111800868 A | 10/2020 |
| EP | 3735083 A1 | 11/2020 |
| WO | WO 2020144036 A1 | 7/2020 |

OTHER PUBLICATIONS

European Patent Application No. 20960388.5, Search and Opinion dated Aug. 9, 2024, 11 pages.

(Continued)

*Primary Examiner* — Andrew Lee
(74) *Attorney, Agent, or Firm* — Cozen O'Connor

(57) ABSTRACT

A communication method is performed to a user equipment, and comprises: determining a first time-frequency resource range; and for a physical downlink control channel (PDCCH) within the first time-frequency resource range, determining a first minimum scheduling offset value associated with the first time-frequency resource range, wherein the first minimum scheduling offset value indicates a minimum value of a time domain offset between a PDCCH transmission and a physical channel transmission scheduled by the PDCCH transmission.

17 Claims, 3 Drawing Sheets

(56) References Cited

U.S. PATENT DOCUMENTS

| | | | |
|---|---|---|---|
| 2022/0039072 A1* | 2/2022 | Babaei | H04L 5/0053 |
| 2022/0110148 A1* | 4/2022 | Oh | H04W 72/23 |
| 2022/0150827 A1* | 5/2022 | Kim | H04W 72/23 |
| 2022/0312440 A1* | 9/2022 | Bagheri | H04W 72/044 |
| 2022/0338120 A1* | 10/2022 | Ma | H04W 72/0446 |
| 2023/0011965 A1* | 1/2023 | Ma | H04W 72/23 |
| 2023/0072069 A1* | 3/2023 | Wu | H04L 5/0098 |
| 2023/0097818 A1* | 3/2023 | Maleki | H04L 5/0053 |
| | | | 455/574 |

OTHER PUBLICATIONS

Indian Patent Application No. 202347038457, Office Action dated Oct. 3, 2024, 2 pages.
PCT/CN2020/127113, English translation of Search Report dated Jul. 23, 2021, 2 pages.
Indian Patent Application No. 202347038457, Office Action dated Dec. 20, 2023, 5 pages.

* cited by examiner

COMMUNICATION METHOD, ELECTRONIC DEVICE AND STORAGE MEDIUM

CROSS-REFERENCE TO RELATED APPLICATION

This application is the U.S. national phase application of International Application No. PCT/CN2020/127113, filed on Nov. 6, 2020, the entire disclosure of which is incorporated herein by reference.

TECHNICAL FIELD

The disclosure relates to a field of wireless communication technologies, particularly to a method and an apparatus for communication, and a storage medium.

BACKGROUND

The ongoing development of a new generation of Internet applications creates high requirements for wireless communication technology, and pushes the continuous evolution of wireless communication technology to meet the needs of applications. Energy saving techniques for devices is one of the hotspots in research of wireless communication technology.

SUMMARY

According to a first aspect of the embodiments of the disclosure, there is provided a method for communication performed by a user equipment (UE). The method includes: determining a first time-frequency resource range, and determining a first minimum scheduling offset value associated with the first time-frequency resource range, for a physical downlink control channel (PDCCH) within the first time-frequency resource range. The first minimum scheduling offset value indicates a minimum value of a time domain offset between a PDCCH transmission and a physical channel transmission scheduled by the PDCCH transmission.

According to a second aspect of the embodiments of the disclosure, there is provided a method for communication, performed by a network device, the method includes: determining a first time-frequency resource range. The first time-frequency resource range is associated with a first minimum scheduling offset value. The first minimum scheduling offset value indicates a minimum value of a time domain offset between a PDCCH transmission and a physical channel transmission scheduled by the PDCCH transmission.

According to a third aspect of the embodiments of the disclosure, there is provided a UE, including: a processor, and a memory, stored with instructions executable by the processor. The processor is configured to determine a first time-frequency resource range, and determine a first minimum scheduling offset value associated with the first time-frequency resource range, for a physical downlink control channel (PDCCH) within the first time-frequency resource range, in which the first minimum scheduling offset value indicates a minimum value of a time domain offset between a PDCCH transmission and a physical channel transmission scheduled by the PDCCH transmission.

It should be understood that both the foregoing general description and the following detailed description are exemplary and explanatory only, which are not intended to limit the embodiments of the disclosure.

BRIEF DESCRIPTION OF THE DRAWINGS

The accompanying drawings, which are incorporated in and constitute a part of this specification, illustrate embodiments consistent with the disclosure and together with the specification serve to explain principles of the disclosure.

DETAILED DESCRIPTION

Exemplary embodiments may be described in detail herein, examples of which are illustrated in the accompanying drawings. Where the following description refers to the drawings, the same numerals in different drawings refer to the same or similar elements unless otherwise indicated. The implementations described in the following exemplary embodiments do not represent all implementations consistent with the disclosure. Rather, they are merely examples of apparatuses and methods consistent with some aspects of the disclosure, as recited in the appended claims.

Figure 1:
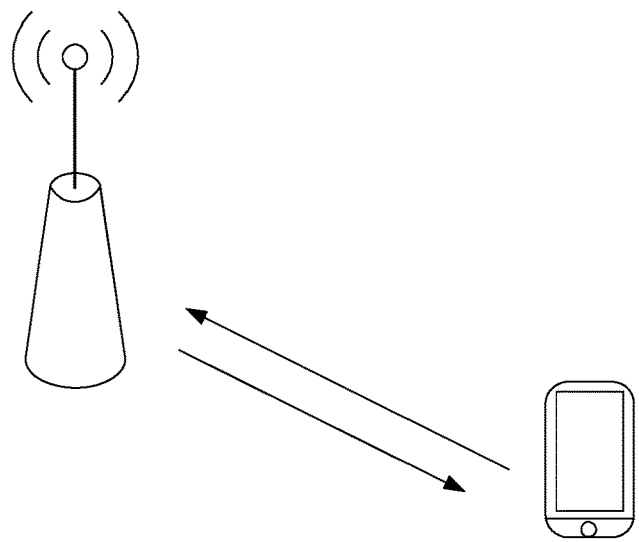
FIG. 1 is a structural diagram of a wireless communication system according to an exemplary embodiment.

The method for communication according to the embodiments of the disclosure may be applied to the wireless communication system shown in FIG. 1. Referring to FIG. 1, the wireless communication system includes a user equipment (UE) and a network device. The UE is connected to the network device through wireless resources, sends and receives data.

It may be understood that the wireless communication system shown in FIG. 1 is only for schematic illustration, and the wireless communication system may also include other network devices, such as core network devices, wireless relay devices, and wireless backhaul devices, etc. which are not shown in FIG. 1. A number of network devices and a number of UEs included in the wireless communication system are not limited in the embodiment of the disclosure.

It may be further understood that the wireless communication system in the embodiment of the disclosure is a network that provides a wireless communication function. The wireless communication system may use different communication technologies, such as code division multiple access (CDMA), wideband code division multiple access (WCDMA), time division multiple access (TDMA), frequency division multiple access (FDMA), orthogonal frequency-division multiple access (OFDMA), single carrier FDMA (SC-FDMA), Carrier Sense Multiple Access with Collision Avoidance. According to the capacity, speed, delay and other factors of different networks, the network may be divided into a 2nd generation (2G) network, a 3G network, a 4G network or a future evolution network, such as a 5G network. The 5G network may also be called a new radio (NR) network. For convenience of description, a wireless communication network may be simply referred to a as a network in the disclosure sometimes.

Further, the network device involved in this disclosure may also be referred to as a radio access network device. The wireless access network device may be a base station, an evolved base station (evolved node B), a home base station, an access point (AP) in a wireless fidelity (WIFI) system, a wireless relay node, a wireless backhaul node, a transmission point (TP) or a transmission and reception point (TRP), etc. The wireless access network device may also be a gNB in an NR system, or may also be a component or a part of device that constitutes a base station. When it is a vehicle-to-everything (V2X) communication system, the network device may also be a vehicle-mounted device. It should be understood that, the specific technology and specific device form adopted by the network device may be not limited in the embodiments of the disclosure.

Further, the UE involved in this disclosure may also be referred to as a terminal equipment, a terminal, a mobile station (MS), a mobile terminal (MT), etc., which is a device that provides users with voice and/or data connectivity. For example, a terminal may be a handheld device or a vehicle-mounted device with a wireless connection function. At present, examples of some terminals are: smart phones, pocket personal computers (PPCs), palmtop computers, personal digital assistants (PDAs), notebook computers, tablet computers, wearable devices, or vehicle-mounted devices, etc. In addition, when it is a vehicle-to-everything (V2X) communication system, the terminal device may also be a vehicle-mounted device. It should be understood that, the specific technology and specific device form adopted by the terminal may be not limited in the embodiment of the disclosure.

UE energy saving has become a hotspot in the research of wireless communication technology. In the related art, cross-slot scheduling is adopted. For example, a method for UE energy saving in Rel-16 is based on the cross-slot scheduling. The network device may configure up to two minimum K0 values for the UE. The minimum K0 value specifies a minimum slot interval between a slot where the downlink PDCCH transmission of the network device is located and a slot where the PDSCH transmission scheduled by the PDCCH transmission is located. When K0=0, it means the downlink PDSCH transmission and corresponding downlink PDCCH transmission are scheduled in the same slot. When the minimum K0 value is set to be greater than or equal to 1, the downlink PDSCH transmission and the corresponding downlink PDCCH transmission may be scheduled in different slots. For a downlink slot, the UE may monitor 2 or 3 symbols where a control resource set (CORESET) that may appear on the PDCCH is located. Since the UE does not have downlink data scheduling most of the time, energy consumption of the UE when downlink monitoring may be effectively reduced, but delays in downlink data transmission may be caused.

However, with the development of communication technology, various variable-rate periodic services appear, such as an Extended Reality (XR) service. For variable-rate periodic services, a data size of each period may vary greatly, which is not suitable for configured grant (CG) transmission, and the DCI needs to be used for dynamic scheduling. For the variable-rate periodic services (e.g., XR services), the size and weight of a device are limited (e.g., AR glasses), and the requirements for energy saving are also high. At the same time, the variable-rate periodic services (e.g., XR services) also have high requirements for delay. If the above energy saving solution based on cross-slot scheduling is adopted to save energy, and the minimum K0 value is set to a value greater than or equal to 1, it may cause an increase in the delay of the variable rate periodic services (e.g., XR services). Therefore, the energy saving solution in Rel-16 based on cross slot scheduling cannot be directly used.

Further, the related art supports the use of DCI to switch the minimum K0 value, but the switched K0 value needs to take effect after a period of time after receiving the DCI carrying a switching command. The period of the variable-rate periodic service (e.g., XR service) may be a few milliseconds to tens of milliseconds. The use of DCI to switch may lead to a high signaling overhead and a low communication efficiency.

In view of this, an embodiment of the disclosure provides a method for communication where a specified minimum scheduling offset value is applied to a PDCCH received within a specified time-frequency resource range, so as to reduce the signaling overhead and improve the communication efficiency.

In the embodiments of the disclosure, for convenience of description, the specified time-frequency resource range is referred to as the first time-frequency resource range, and the specified minimum scheduling offset value applied to the PDCCH received within the specified time-frequency resource range is referred to as the first minimum scheduling offset value.

Figure 2:
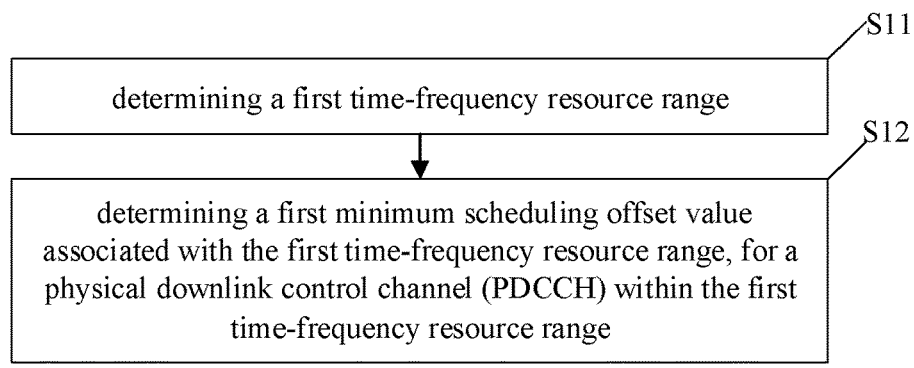
FIG. 2 is a flowchart illustrating a method for communication applied to a user equipment, according to an exemplary embodiment.

FIG. 2 is a flowchart illustrating a method for communication according to an exemplary embodiment. As shown in FIG. 2, the method is applied to a UE, and includes the following steps.

At S11, a first time-frequency resource range is determined.

In the embodiment of the disclosure, the first time-frequency resource range may be independently determined by the UE based on a protocol, or based on a factory configuration, or based on a network device, a signal strength, and the like. The first time-frequency resource range in the embodiment of the disclosure may be a time-frequency resource range used by variable-rate periodic service scheduling.

Further, the time-frequency resource involved in the embodiments of the disclosure may be understood as a time resource, a frequency resource, or a time-frequency resource.

In an implementation, the UE may receive a downlink control signaling sent from a network device. The downlink control signaling indicates the first time-frequency resource range. The first time-frequency resource range may be determined according to the downlink control signaling sent by the network device. The downlink control signaling may be a physical layer signaling, a radio resource control (RRC) signaling, or a media access control (MAC) signaling.

At S12, a first minimum scheduling offset value associated with the first time-frequency resource range is determined for a PDCCH within the first time-frequency resource range.

The first minimum scheduling offset value indicates a minimum value of a time domain offset between a PDCCH transmission and a physical channel transmission scheduled by the PDCCH transmission. The PDCCH transmission scheduling may be understood as that the scheduling information is carried by the DCI. The DCI is carried in the PDCCH.

In the embodiments of the disclosure, the first minimum scheduling offset value is associated with the first time-frequency resource range, and it may also be understood that the first minimum scheduling offset value is specially configured for the first time-frequency resource range.

In this embodiment of the disclosure, the first minimum scheduling offset value may be a predefined default value. For example, the first minimum scheduling offset value may be a default value set based on a communication protocol, or a default value based on a factory configuration. Alternatively, the first minimum scheduling offset value may also be independently determined by the UE based on a network environment, parameters of a currently running app, and the like. Alternatively, the first minimum scheduling offset value is determined based on the downlink control signaling sent from the network device. The downlink control signaling may be a physical layer signaling, a RRC signaling, or a MAC signaling.

In the embodiment of the disclosure, the first minimum scheduling offset value includes a minimum K0 value, and the K0 value may be understood as a slot offset value between the PDCCH transmission and the PDSCH transmission scheduled by the PDCCH transmission. Alternatively, the first minimum scheduling offset value includes a minimum K2 value, and the K2 value is a slot offset value between the PDCCH transmission and the PUSCH transmission scheduled by the PDCCH transmission. Alternatively, the first minimum scheduling offset value includes the minimum K0 value and the minimum K2 value.

In the embodiments of the disclosure, the first minimum scheduling offset value may be understood as being associated with the first time-frequency resource range.

The first minimum scheduling offset value may be implicitly associated with the first time-frequency resource range, or may be explicitly associated with the first time-frequency resource range.

In an implementation, the implicit association of the first minimum scheduling offset value with the first time-frequency resource range may be understood as that, the network device indicates the first time-frequency resource range to the UE, without separately indicating the first minimum scheduling offset value associated with the first time-frequency resource range, or the network device indicates the first minimum scheduling offset value to the UE, without separately indicating the first time-frequency resource range. The UE may determine the first time-frequency resource range indicated by the DCI through, for example, a format of the downlink control signaling, a specific mapping relationship, and the like.

In an implementation, the explicit association of the first minimum scheduling offset value with the first time-frequency resource range may be understood as that, the UE determines the first time-frequency resource range, and the first minimum scheduling offset value associated with the first time-frequency resource range.

In the embodiments of the disclosure, the first time-frequency resource range may be determined based on downlink configuration information sent by the network device, or the first time-frequency resource range may also be predefined. The first minimum scheduling offset value may be determined based on the downlink configuration information sent by the network device, or the first minimum scheduling offset value may also be predefined.

In an implementation, the predefined default value of the first minimum scheduling offset value is 0.

The first minimum scheduling offset value applied to the PDCCH received within the first time-frequency resource range may be 0. When the first minimum scheduling offset value is 0, it may be understood that no first minimum scheduling offset value is configured for the first time-frequency resource range. The PDCCH received within the first time-frequency resource range is not limited by the first minimum scheduling offset value, or a time difference between the PDCCH transmission within the first time-frequency resource range and the PDSCH transmission scheduled by the PDCCH transmission is not limited by the first minimum scheduling offset. In an example, when the minimum K0 is not configured, the minimum K0=0 by default, that is, cross slot scheduling for energy saving is not supported. Further, K0 is a slot interval between the PDCCH transmission and its scheduled downlink PDSCH transmission, so the minimum K0 means the same slot scheduling. K2 is similar to K0.

It may be understood that in the embodiments of the disclosure, the PDCCH received within the first time-frequency resource range is limited by the first minimum scheduling offset value, which may be understood as a time domain offset K0 value between the PDCCH and its scheduled PDSCH needs to meet a condition of being greater than or equal to the minimum K0 value. The PDCCH received within the first time-frequency resource range is not limited by the first minimum scheduling offset value, which may be understood as a time domain offset K0 value between the PDCCH and its scheduled PDSCH does not need to meet the condition of being greater than or equal to the minimum K0 value.

The time domain offset K0 value between the PDCCH and its scheduled PDSCH may be a set of time domain offset K0 values.

In the embodiment of the disclosure, the network device needs to ensure that the time domain offset between the PDCCH transmission and the physical channel transmission scheduled by the PDCCH transmission within the first time-frequency resource range, scheduled to the UE, meets the condition of being greater than or equal to the minimum K0 value. The UE defaults that the network device schedules to the UE that, the time domain offset between the PDCCH transmission and the physical channel transmission scheduled by the PDCCH transmission within the first time-frequency resource range is greater than or equal to the minimum K0 value.

In the embodiments of the disclosure, in an implementation, the first time-frequency resource range may be determined according to the downlink configuration information sent by the network device. In another implementation, the first time-frequency resource range may also be predefined.

In an implementation of the embodiments of the disclosure, the first time-frequency resource range may include time-frequency resources determined based on a CORESET for blind detection of the PDCCH. The first time-frequency resource range may also include time-frequency resources determined based on a search space (SS) for blind detection of the PDCCH.

In the embodiments of the disclosure, the CORESET used to determine the first time-frequency resource range is called the first CORESET, and the SS used to determine the first time-frequency resource range is called the first SS. The first SS may be a SS set. That is, in the embodiment of the disclosure, the first time-frequency resource range may include time-frequency resources determined based on the first CORESET and/or the first SS for blind detection of the PDCCH.

The UE may receive the downlink control signaling sent by the network device, and determine the first CORESET and/or the first SS based on the downlink control signaling.

In an example, the network device may indicate, through the downlink control signaling, a specific SS or SS set for monitoring a PDCCH of scheduling user downlink data to the UE.

When the UE is configured with the minimum K0 value and/or the minimum K2 value, the time difference between the PDCCH on the specified SS and its scheduled PDSCH is not limited by the minimum K0 value, and/or the time difference between the PDCCH on the specified SS and its scheduled PUSCH is not limited by the minimum K2 value. For the specified SS, the UE performs PDCCH monitoring without configuring the minimum K0 value, that is, the UE does not perform energy saving optimization based on the cross-slot scheduling.

In another example, the network device may indicate, through the downlink control signaling, a specific SS or SS set for monitoring the PDCCH of scheduling user downlink data to the UE, and indicate the minimum K0 value and/or the minimum K2 value associated with the SS or SS set. The PDCCH scheduling on the specified SS is limited by its associated minimum K0 value and/or minimum K2 value. For the specified SS, the UE monitors the PDCCH according to its associated minimum K0 value and/or minimum K2 value.

In another implementation of the embodiments of the disclosure, the first time-frequency resource range may include time-frequency resources within a specified time window (hereinafter referred to as the first time window).

The UE may receive the downlink control signaling sent by the network device, and determine the time-frequency resource within the first time window based on the downlink control signaling.

In the embodiment of the disclosure, the first time window may be periodic.

In an example, the network device may configure the first time window for the UE through the downlink control signaling. If the UE is configured with the minimum K0 value and/or the minimum K2 value, the time interval between the PDCCH within the first time window and its scheduled PDSCH is not limited by the minimum K0 value, and/or the time interval between the PDCCH within the first time window and its scheduled PUSCH is not limited by the minimum K2 value. The UE monitors the PDCCH without configuring the minimum K0 value and/or the minimum K2 value.

In another example, the network device may configure the first time window for the UE through the downlink control signaling, and configure the minimum K0 value and/or the minimum K2 value associated with the first time window. The time interval between a PDCCH within the first time window and its scheduled PDSCH is limited by the associated minimum K0 value. The UE monitors the PDCCH according to the associated minimum K0 value and/or minimum K2 value.

In the embodiments of the disclosure, at least one of the first CORESET, the first SS, or the first time window is determined based on the downlink control signaling sent from the network device.

In the embodiment of the disclosure, the UE is configured with a second minimum scheduling offset value different from the first minimum scheduling offset value, that is, the first time-frequency resource may also be configured with other minimum scheduling offset value (hereinafter referred to as the second minimum scheduling offset value) different from the first minimum scheduling offset value. In an embodiment of the disclosure, the first minimum scheduling offset value (a priority of which is higher than a priority of the second minimum scheduling offset value) may be applied based on the priority of the first minimum scheduling offset value and the priority of the second minimum scheduling offset value. For example, the minimum scheduling offset value applied to the PDCCH received within the first time-frequency resource range is determined based on a priority order of the minimum scheduling offset values. In an example, when the priority of the first minimum scheduling offset value is higher than the priority of the second minimum scheduling offset value, the first minimum scheduling offset value is applied.

In an example, the network device indicates through the downlink control signaling, a specific SS or SS set for monitoring the PDCCH of user downlink data scheduling, the minimum K0 value and/or the minimum K2 value associated with the SS or SS set, to the UE. The SS or SS set associated with the minimum K0 value and/or the minimum K2 value is also configured with other minimum K0 value and/or other minimum K2 value (such as, the method for minimum K0 configuration in Rel 16 configures the minimum K0 value according to a size of a sub-carrier space, SCS). The network device scheduling is preferentially limited by the minimum K0 value and/or minimum K2 value associated with the SS, and the UE preferentially performs PDCCH monitoring according to the minimum K0 value and/or minimum K2 value associated with the SS.

In another example, the network device indicates a specific time window for the UE through the downlink control signaling, and configures a minimum K0 value and/or a minimum K2 value associated with the specific time window. The time window may be periodic. The time window associated with the minimum K0 value and/or the minimum K2 value is also configured with other minimum K0 value and/or other minimum K2 values (such as, the method for minimum K0 configuration in Rel 16 configures the minimum K0 value according to the size of the SCS). The network device scheduling is preferentially limited by the minimum K0 value and/or minimum K2 value associated with the time window, and the UE preferentially performs PDCCH monitoring according to the minimum K0 value and/or minimum K2 value associated with the time window.

Figure 3:
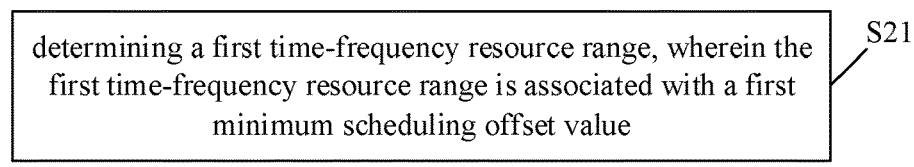
FIG. 3 is a flowchart illustrating a method for communication applied to a network device, according to an exemplary embodiment.

FIG. 3 is a flowchart illustrating a method for communication according to an exemplary embodiment. As shown in FIG. 3, the method is applied to a network device, and includes the following steps.

At S21, a first time-frequency resource range is determined, and the first time-frequency resource range is associated with a first minimum scheduling offset value. The first minimum scheduling offset value indicates a minimum value of a time domain offset between a PDCCH transmission and a physical channel transmission scheduled by the PDCCH transmission.

In an implementation, the first minimum scheduling offset value includes a minimum K0 value and/or a minimum K2 value.

The K0 value is a slot offset value between the PDCCH transmission and a PDSCH transmission scheduled by the PDCCH transmission. The K2 value is a slot offset value between the PDCCH transmission and the 1 PUSCH transmission scheduled by the PDCCH transmission.

In an embodiment, the first time-frequency resource range includes a time-frequency resource determined based on the first CORESET and/or the first SS for blind detection of the PDCCH. Alternatively, the first time-frequency resource range includes a time-frequency resource within the first time window.

In an implementation, in the embodiment of the disclosure, the network device may also send a downlink control signaling. The first time-frequency resource range is indicated through the downlink control signaling.

In an implementation, the first minimum scheduling offset value is a predefined default value; or the first minimum scheduling offset value is determined by the UE and sent to the network device; or the first minimum scheduling offset value is independently determined by the network device. The predefined default value is 0.

The first time-frequency resource range includes time-frequency resources determined based on the first CORESET and/or the first SS. Alternatively, the first time-frequency resource range includes time-frequency resources within the first time window.

In an implementation, the network device may send a downlink control signaling. The downlink control signaling is used to indicate at least one of: the first CORESET, the first SS, or the first time window.

In an implementation, the network device may also send a downlink configuration information. The downlink configuration information is used to indicate the first time-frequency resource range and/or the first minimum scheduling offset value. The first minimum scheduling offset value associated with the first time-frequency resource range is determined based on downlink configuration information sent by the network device.

In an embodiment, the network device schedules based on the first minimum scheduling offset value, the time domain offset between the PDCCH transmission and the physical channel transmission scheduled by the PDCCH transmission, for the first time-frequency resource range to the UE.

It may be understood that the communication method applied to the network device in the embodiment of the disclosure is a corresponding implementation of the above-mentioned communication method applied to the UE. The description of the communication method applied to the network device that is not detailed enough may refer to the related embodiment description of the above-mentioned communication method applied to the UE.

The method for communication according to the embodiments of the disclosure may also be applied in an interaction implementation process between the network device and the UE. In the interaction implementation process between the network device and the UE, the network device and the UE respectively implement their own function of the above-mentioned communication method, which may not be described in detail here.

In the method for communication according to the embodiments of the disclosure, the first minimum scheduling offset value associated with the first time-frequency resource range is applied to communication. In application scenarios with transmission for variable-rate large-flow quasi-periodic data, since the arrival time of such variable-rate large-flow quasi-periodic data is regular, energy-saving benefits of the cross slot scheduling are low and the delay requirements is relatively high, then scheduling (i.e., an intra-slot scheduling) may be performed according to a smaller minimum K0 value and/or minimum K2 value (e.g., K0=0).

In the embodiment of the disclosure, if K0=0, the UE needs to receive according to the intra-slot scheduling that may occur, i.e., all subsequent time domain symbols need to be received and buffered in addition to OFDM time domain symbols for PDCCH monitoring, in one slot. When it is detected that the PDCCH exists and the intra-slot scheduling occurs, it is necessary to demodulate the PDSCH scheduled by the PDCCH on correct time-frequency resources according to the indication of the PDCCH. When it is not detected that the PDCCH exists or there is no scheduling for this slot, the buffered signal is discarded.

In addition to variable-rate large-flow quasi-periodic data (such as XR services), the UE also has downlink data of other services or downlink data of some XR services that do not require high delay. For these data, there is no strong regularity in their arrival time, and the cross-slot scheduling may be used to save energy.

If the UE is configured with the minimum K0 value, the PDCCH and its scheduled PDSCH are not in the same slot. Within one slot, the UE may receive OFDM symbols that are monitored by the PDCCH and scheduled by the PDCCH of the previous slot, thus saving the energy consumption caused by unnecessary reception.

To sum up, from the perspective of energy saving, with the method for communication according to the embodiments of the disclosure, the UE is expected to support the intra-slot scheduling for a part of services (which may include services for the above variable-rate large-flow quasi-periodic data) and the inter-slot scheduling for other services (which may include services for downlink data of some XR services that do not require high delay) at the same time.

Based on the same concept, an embodiment of the disclosure further provides an apparatus for communication.

It may be understood that, in order to realize the above-mentioned functions, the apparatus for communication according to the embodiments of the disclosure includes corresponding hardware structures and/or software modules for performing various functions. Combining the units and algorithm steps of each example disclosed in the embodiments of the disclosure, the embodiments of the disclosure may be implemented in the form of hardware or a combination of hardware and computer software. Whether a certain function is executed by hardware or computer software driving hardware depends on the specific application and design constraints of the technical solution. Those skilled in the art may use different methods to implement the described functions for each specific application, but such implementation should not be regarded as going beyond the scope of the technical solutions in the embodiments of the disclosure.

Figure 4:
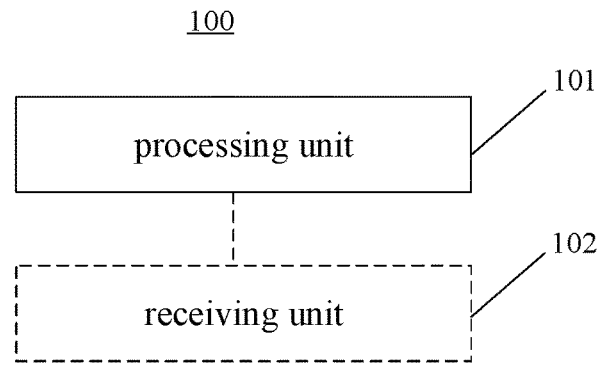
FIG. 4 is a block diagram of a user equipment for communication according to an exemplary embodiment.

FIG. 4 is a block diagram of an apparatus for communication according to an exemplary embodiment. Referring to FIG. 4, the communication apparatus 100 includes a processing unit 101 and a receiving unit 102. The communication apparatus 100 is applied to UE.

The processing unit 101 is configured to determine a first time-frequency resource range, and determine a first minimum scheduling offset value associated with the first time-frequency resource range, for a PDCCH within the first time-frequency resource range. The first minimum scheduling offset value indicates a minimum value of a time domain offset between a PDCCH transmission and a physical channel transmission scheduled by the PDCCH transmission.

In an implementation, the communication apparatus 100 further includes a receiving unit 102, configured to: receive a downlink control signaling sent from a network device. The downlink control signaling indicates the first time-frequency resource range.

In an implementation, the first minimum scheduling offset value is a predefined default value; or the first minimum scheduling offset value is independently determined by the UE; or the first minimum scheduling offset value is determined based on a downlink control signaling sent from a network device.

In an implementation, the first minimum scheduling offset value includes a minimum K0 value and/or a minimum K2 value. The K0 value is a slot offset value between the PDCCH transmission and a PDSCH transmission scheduled by the PDCCH transmission. The K2 value is a slot offset value between the PDCCH transmission and a PUSCH transmission scheduled by the PDCCH transmission.

In an embodiment, the predefined default value is 0.

In an implementation, the first time-frequency resource range includes: time-frequency resources determined based on a first control resource set and/or a first search space; or time-frequency resources within a first time window.

In an implementation, at least one of the first control resource set, the first search space, or the first time window is determined based on a downlink control signaling sent from a network device.

In an embodiment, the UE is configured with a second minimum scheduling offset value different from the first minimum scheduling offset value.

In an embodiment, the processing unit 101 is further configured to: apply the first minimum scheduling offset value based on a priority of the first minimum scheduling offset value and a priority of the second minimum scheduling offset value. The priority of the first minimum scheduling offset value is higher than the priority of the second minimum scheduling offset value.

Figure 5:
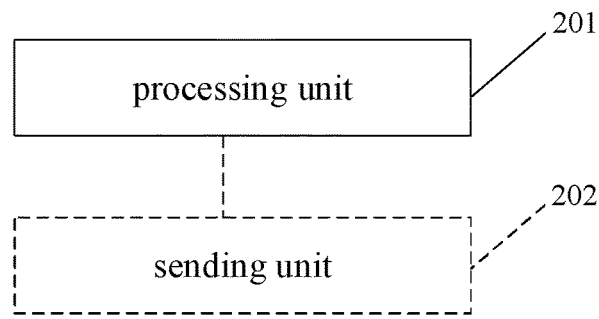
FIG. 5 is a block diagram of a network device for communication according to an exemplary embodiment.

FIG. 5 is a block diagram of an apparatus for communication according to an exemplary embodiment. Referring to FIG. 5, the communication apparatus 200 includes a processing unit 201. The communication apparatus 200 is applied to a network device.

The processing unit 201 is configured to determine a first time-frequency resource range, and the first time-frequency resource range is associated with a first minimum scheduling offset value. The first minimum scheduling offset value indicates a minimum value of a time domain offset between a PDCCH transmission and a physical channel transmission scheduled by the PDCCH transmission.

In an implementation, the apparatus 200 further includes a sending unit 202, configured to: send a downlink control signaling. The downlink control signaling indicates the first time-frequency resource range.

In an implementation, the first minimum scheduling offset value is a predefined default value; or the first minimum scheduling offset value is determined by the UE and sent to the network device; or the first minimum scheduling offset value is independently determined by the network device.

In an implementation, the first minimum scheduling offset value includes a minimum K0 value and/or a minimum K2 value; the K0 value is a slot offset value between the PDCCH transmission and a PDSCH transmission scheduled by the PDCCH transmission; and the K2 value is a slot offset value between the PDCCH transmission and a PUSCH transmission scheduled by the PDCCH transmission.

In an implementation, the predefined default value is 0.

In an implementation, the first time-frequency resource range includes: time-frequency resources determined based on a first control resource set and/or a first search space; or time-frequency resources within a first time window.

In an implementation, the apparatus 200 further includes a sending unit 202, configured to: send a downlink control signaling. The downlink control signaling indicates at least one of: the first control resource set, the first search space, or the first time window.

In an implementation, the processing unit 201 is further configured to: for the first time-frequency resource range, schedule based on the first minimum scheduling offset value, the time domain offset between the PDCCH transmission and the physical channel transmission scheduled by the PDCCH transmission to the UE.

Regarding the apparatus in the foregoing embodiments, the specific manner in which each module executes operations has been described in detail in the embodiments related to the method, which may not be described in detail here.

Figure 6:
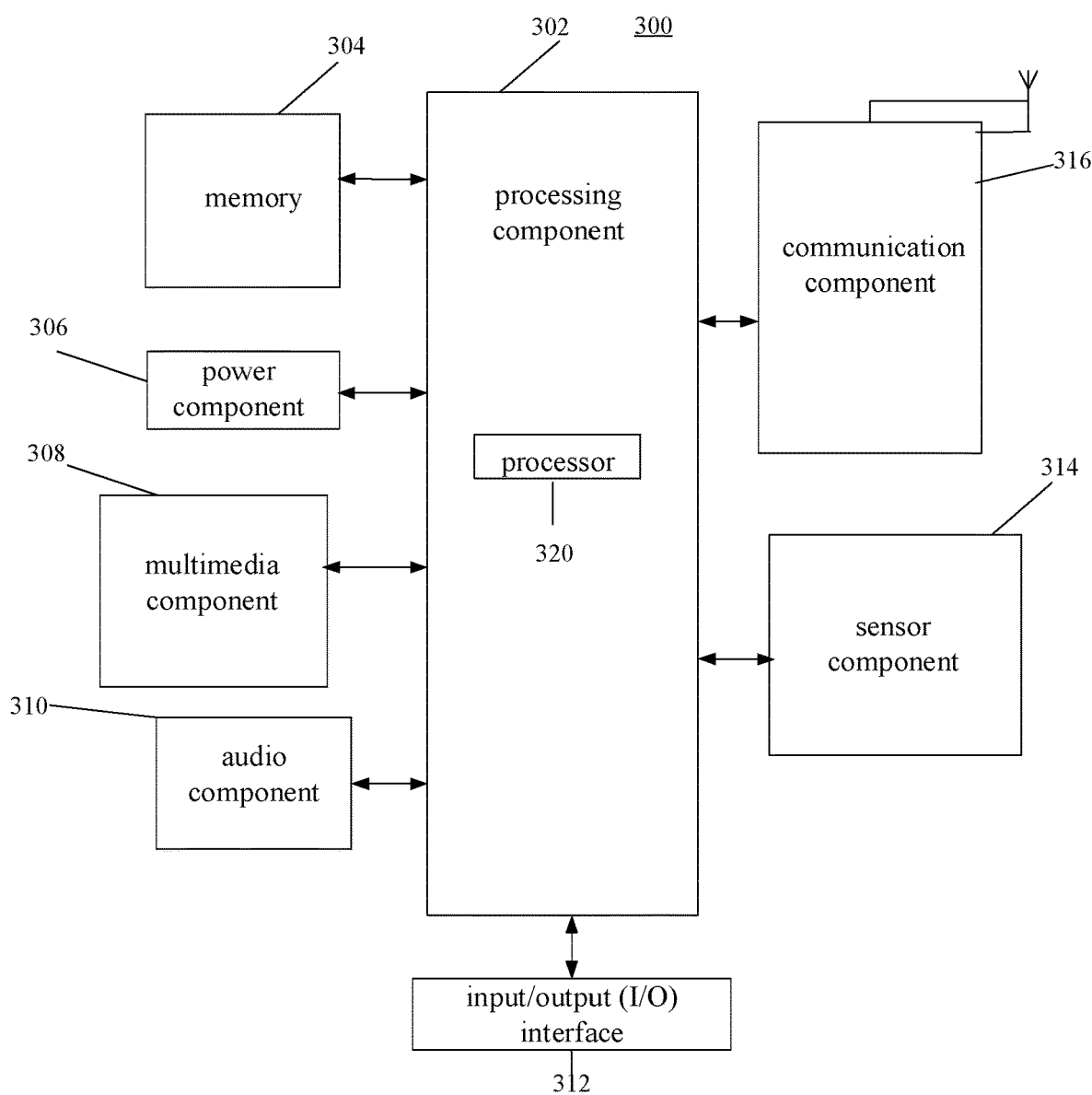
FIG. 6 is a block diagram of a device for communication according to an exemplary embodiment.

FIG. 6 is a block diagram of a device 300 for communication according to an exemplary embodiment. For example, the device 300 may be a mobile phone, a computer, a digital broadcast terminal, a messaging device, a game console, a tablet device, a medical device, a fitness device, a personal digital assistant, or the like.

Referring to FIG. 6, the device 300 may include one or more of the following components: a processing component 302, a memory 304, a power component 306, a multimedia component 308, an audio component 310, an input/output (I/O) interface 312, a sensor component 314, and a communication component 316.

The processing component 302 generally controls overall operations of the device 300, such as the operations associated with display, phone calls, data communications, camera operations, and recording operations. The processing component 302 may include one or more processors 320 to execute instructions to perform all or some of the steps of the methods described above. Moreover, the processing component 302 may include one or more modules that facilitate interactions between the processing component 302 and other components. For example, the processing component 302 may include a multimedia module to facilitate interactions between the multimedia component 308 and the processing component 302.

The memory 304 is configured to store various types of data to support operation of the device 300. Examples of such data include instructions for any application or method operating on the device 300, contact data, phonebook data, messages, pictures, videos, and the like. The memory 304 may be implemented by any type of volatile or nonvolatile storage device or their combination, such as a static random-access memory (SRAM), an electrically-erasable programmable read only memory (EEPROM), an erasable programmable read only memory (EPROM), a programmable read only memory (PROM), a read only memory (ROM), a magnetic memory, a flash memory, a magnetic or optical disk.

The power component 306 provides power to various components of the device 300. The power component 306 may include a power management system, one or more power sources, and any other components associated with the generation, management, and distribution of power in the device 300.

The multimedia component 308 includes a screen providing an output interface between the device 300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, swipes, and gestures on the touch panel. The touch sensors may not only sense a boundary of a touch or swipe action, but also sense a duration and a pressure associated with the touch or swipe action. In some embodiments, the multimedia component 308 includes a front-facing camera and/or a rear-facing camera. When the device 300 is in an operating mode, such as a shooting mode or a video mode, the front-facing camera and/or the rear-facing camera can receive external multimedia data. Each front-facing camera and rear-facing camera may be a fixed optical lens system or has focal length and optical zoom capability.

The audio component 310 is configured to output and/or input audio signals. For example, the audio component 310 includes a microphone (MIC for short) that is configured to receive external audio signals when the device 300 is in an operating mode, such as a call mode, a recording mode, and a voice recognition mode. The received audio signal may be further stored in the memory 304 or transmitted via the communication component 316. In some embodiments, the audio component 310 also includes a speaker for outputting audio signals.

The I/O interface 312 provides an interface between the processing component 302 and peripheral interface modules, such as a keyboard, a click wheel, buttons, and the like. The buttons may include, but are not limited to, a home button, a volume button, a starting button, and a locking button.

The sensor component 314 includes one or more sensors to provide status assessments of various aspects of the device 300. For instance, the sensor component 314 may detect an open/closed status of the device 300, relative positioning of components, e.g., the display and the keypad, of the device 300, a change in position of the device 300 or a component of the device 300, a presence or absence of user contact with the device 300, an orientation or an acceleration/deceleration of the device 300, and a change in temperature of the device 300. The sensor component 314 may include a proximity sensor configured to detect the presence of nearby objects without any physical contact. The sensor component 314 may also include a light sensor, such as a complementary metal oxide semiconductor (CMOS) or a charge-coupled device (CCD) image sensor, for use in imaging applications. In some embodiments, the sensor component 314 may also include an accelerometer sensor, a gyroscope sensor, a magnetic sensor, a pressure sensor, or a temperature sensor.

The communication component 316 is configured to facilitate communication, wired or wirelessly, between the device 300 and other devices. The device 300 can access a wireless network based on a communication standard, such as WiFi, 2G, or 3G, or their combination. In an exemplary embodiment, the communication component 316 receives a broadcast signal or broadcast associated information from an external broadcast management system via a broadcast channel. In an exemplary embodiment, the communication component 316 further includes a near field communication (NFC) module to facilitate short-range communications. For example, the NFC module may be implemented based on a radio frequency identification (RFID) technology, an infrared data association (IrDA) technology, an ultra-wide band (UWB) technology, a Bluetooth (BT) technology, and other technologies.

In exemplary embodiments, the device 300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above described method.

In exemplary embodiments, there is also provided a non-transitory computer readable storage medium including instructions, such as included in the memory 304, executable by the processor 320 in the device 300, for performing the above method. For example, the non-transitory computer readable storage medium may be a ROM, a random access memory (RAM), a CD-ROM, a magnetic tape, a floppy disc, an optical data storage device, and the like.

Figure 7:
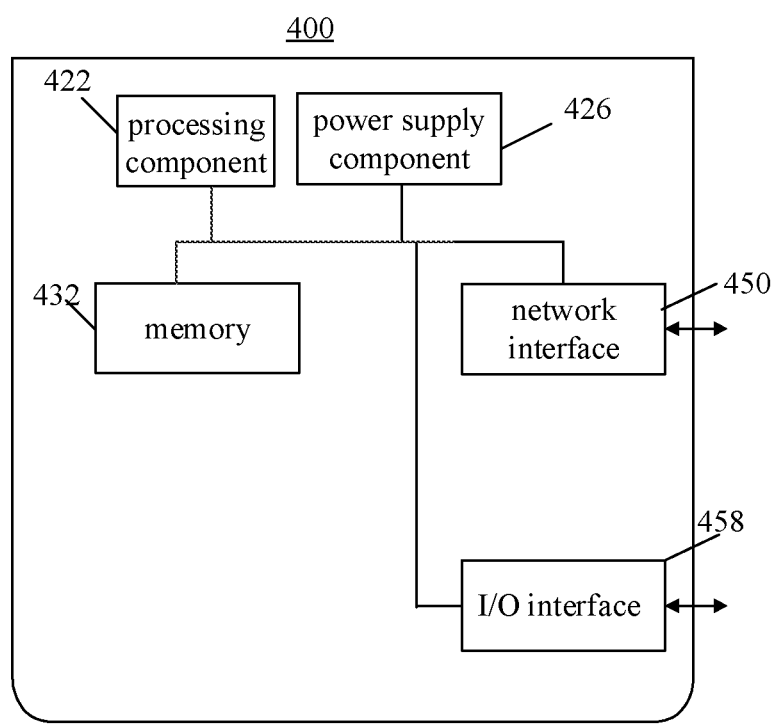
FIG. 7 is a block diagram of a device for communication according to an exemplary embodiment.

FIG. 7 is a block diagram of a device 400 for communication according to an exemplary embodiment. As shown in FIG. 7, the device 400 includes a processing component 422, which further includes one or more processors, and memory resources represented by a memory 432 for storing instructions executable by the processing component 422, such as application programs. The application program stored in the memory 432 may include one or more modules, each of which corresponding to a set of instructions. In addition, the processing component 422 is configured to execute instructions to perform any of the aforementioned methods.

The device 400 may also include a power supply component 426 configured to perform power management of the device 400, a wired or wireless network interface 450 configured to connect the device 400 to a network, and an input output (I/O) interface 458. The device 400 may operate an operating system stored in the memory 432, such as Windows Server™, Mac OS X™, Unix™, Linux™, FreeBSD™ or the like.

In an exemplary embodiment, there is also provided a non-transitory computer-readable storage medium including instructions, such as the memory 432 including instructions, which may be executed by the processing component 422 of the device 400 to implement the above method. For example, the non-transitory computer readable storage medium may be a ROM, a RAM, a CD-ROM, a magnetic tape, a floppy disk, an optical data storage device, and the like.

It may be further understood that, the term "a plurality of" in the disclosure refers to two or more, and other quantifiers are similar to the term. The term "and/or" describes an association relationship of associated objects, indicating that there may be three types of relationships, for example, A and/or B may indicate: A exists alone, A and B exist simultaneously, and B exists independently. The character "/" generally indicates that the contextual objects are in an "or" relationship. The singular forms "a", "said" and "the" are also intended to include the plural unless the context clearly dictates otherwise.

It may be further understood that the terms "first", "second", etc. are used to describe various information, but the information should not be limited to these terms. These terms are only used to distinguish information of the same type from one another, and do not imply a specific order or degree of importance. In fact, expressions such as "first" and "second" may be used interchangeably. For example, without departing from the scope of the disclosure, first information may also be called second information, and similarly, second information may also be called first information.

It may be further understood that although operations are described in a specific order in the drawings in the embodiments of the disclosure, it should not be understood as requiring these operations to be performed in the specific order shown or in a serial order, or requiring all operations shown to be performed to obtain the desired result. In certain circumstances, multitasking and parallel processing may be advantageous.

Those skilled in the art will be aware of other implementations of the disclosure after considering the specification and practicing the disclosure disclosed herein. The disclosure is intended to cover any variations, uses, or adaptive changes of the disclosure, which follow the general principles of the disclosure and include common knowledge or conventional technical means in the technical field not disclosed herein. The description and the embodiments are to be regarded as exemplary, and the true scope of the disclosure are indicated in the following claims.

It should be understood that the disclosure is not limited to the precise structures described above and illustrated in the accompanying drawings, and that various modifications and changes may be made without departing from its scope. The scope of the disclosure is limited only by the appended claims.

What is claimed is:

1. A method for communication, performed by a user equipment (UE), the method comprising:
   determining a first time-frequency resource range, and
   determining a first minimum scheduling offset value associated with the first time-frequency resource range, for a physical downlink control channel (PDCCH) within the first time-frequency resource range, wherein the first minimum scheduling offset value indicates a minimum value of a time domain offset between a PDCCH transmission and a physical channel transmission scheduled by the PDCCH transmission, wherein the UE is configured with a second minimum scheduling offset value different from the first minimum scheduling offset value; and
   applying the first minimum scheduling offset value based on a priority of the first minimum scheduling offset value and a priority of the second minimum scheduling offset value, wherein the priority of the first minimum scheduling offset value is higher than the priority of the second minimum scheduling offset value.

2. The method of claim 1, wherein determining the first time-frequency resource range comprises:
   receiving a downlink control signaling sent from a network device, wherein the downlink control signaling indicates the first time-frequency resource range.

3. The method of claim 1, wherein:
   the first minimum scheduling offset value is a predefined default value; or
   the first minimum scheduling offset value is independently determined by the UE; or
   the first minimum scheduling offset value is determined based on a downlink control signaling sent from a network device.

4. The method of claim 1, wherein the first minimum scheduling offset value comprises at least one of a minimum K0 value or a minimum K2 value;
   the minimum K0 value is a slot offset value between the PDCCH transmission and a physical downlink shared channel (PDSCH) transmission scheduled by the PDCCH transmission; and
   the minimum K2 value is a slot offset value between the PDCCH transmission and a physical uplink shared channel (PUSCH) transmission scheduled by the PDCCH transmission.

5. The method of claim 3, wherein the predefined default value is 0.

6. The method of claim 1, wherein the first time-frequency resource range comprises:
   time-frequency resources determined based on at least one of a first control resource set or a first search space; or
   time-frequency resources within a first time window.

7. The method of claim 6, wherein at least one of the first control resource set, the first search space, or the first time window is determined based on a downlink control signaling sent from a network device.

8. A method for communication, performed by a network device, the method comprising:
   determining a first time-frequency resource range, wherein the first time-frequency resource range is associated with a first minimum scheduling offset value; and
   wherein the first minimum scheduling offset value indicates a minimum value of a time domain offset between a physical downlink control channel (PDCCH) transmission and a physical channel transmission scheduled by the PDCCH transmission-;
   for the first time-frequency resource range, scheduling based on the first minimum scheduling offset value, the time domain offset between the PDCCH transmission and the physical channel transmission scheduled by the PDCCH transmission to a user equipment (UE), wherein the UE is configured with a second minimum scheduling offset value different from the first minimum scheduling offset value; and a priority of the first minimum scheduling offset value is higher than a priority of the second minimum scheduling offset value.

9. The method of claim 8, further comprising:
   sending a downlink control signaling, wherein the downlink control signaling indicates the first time-frequency resource range.

10. The method of claim 8, wherein
    the first minimum scheduling offset value is a predefined default value; or
    the first minimum scheduling offset value is determined by a UE and sent to the network device; or
    the first minimum scheduling offset value is independently determined by the network device.

11. The method of claim 8, wherein the first minimum scheduling offset value comprises at least one of a minimum K0 value or a minimum K2 value;
    the minimum K0 value is a slot offset value between the PDCCH transmission and a physical downlink shared channel (PDSCH) transmission scheduled by the PDCCH transmission; and
    the minimum K2 value is a slot offset value between the PDCCH transmission and a physical uplink shared channel (PUSCH) transmission scheduled by the PDCCH transmission.

12. The method of claim 10, wherein the predefined default value is 0.

13. The method of claim 8, wherein the first time-frequency resource range comprises:
    time-frequency resources determined based on at least one of a first control resource set or a first search space; or
    time-frequency resources within a first time window.

14. The method of claim 13, further comprising:
    sending a downlink control signaling, wherein the downlink control signaling indicates at least one of: the first control resource set, the first search space, or the first time window.

15. A user equipment (UE), comprising:
    a processor, and
    a memory, stored with instructions executable by the processor,
    wherein the processor is configured to:
    determine a first time-frequency resource range, and determine a first minimum scheduling offset value associated with the first time-frequency resource range, for a physical downlink control channel (PDCCH) within the first time-frequency resource range, wherein the first minimum scheduling offset value indicates a minimum value of a time domain offset between a PDCCH transmission and a physical channel transmission scheduled by the PDCCH transmission, wherein the UE is configured with a second minimum scheduling offset value different from the first minimum scheduling offset value;

apply the first minimum scheduling offset value based on a priority of the first minimum scheduling offset value and a priority of the second minimum scheduling offset value, wherein the priority of the first minimum scheduling offset value is higher than the priority of the second minimum scheduling offset value.

16. A network device, comprising:
a processor, and
a memory, stored with instructions executable by the processor,
wherein the processor is configured to implement the method according to claim 8.

17. A non-transitory computer-readable storage medium having instructions stored thereon, wherein when the instructions are executed by a processor of a mobile terminal, the mobile terminal is caused to execute the method according to claim 1.

* * * * *